United States Patent
Axtman et al.

[11] Patent Number: 6,070,199
[45] Date of Patent: May 30, 2000

[54] APPARATUS TO CONNECT A CLIENT COMPUTER TO A COMPUTER DATA NETWORK

[75] Inventors: Daniel P. Axtman; Craig K. Boobar; Vanessa L. Hutchison, all of Boise; Charles M. Jopson, Kuna, all of Id.

[73] Assignee: Extended Systems, Inc., Boise, Id.

[21] Appl. No.: 08/748,959

[22] Filed: Nov. 13, 1996

[51] Int. Cl.[7] ....................................................... G06F 3/00
[52] U.S. Cl. ............................. 710/1; 709/222; 709/223; 709/224; 709/225; 709/226; 709/227; 709/250; 709/251; 709/300; 709/301; 709/302; 370/402; 370/473; 370/85.13; 361/686
[58] Field of Search ..................................... 370/473, 402, 370/85.13, 465, 95.3; 361/686; 395/200.12, 200.15, 527, 500.45; 359/118; 455/58.2; 379/58; 709/250, 300, 301, 302, 222, 223, 224, 225; 710/1

[56] References Cited

U.S. PATENT DOCUMENTS

| | | | |
|---|---|---|---|
| 5,099,346 | 3/1992 | Lee et al. .................................. | 359/118 |
| 5,410,738 | 4/1995 | Diepstraten et al. ................... | 455/58.2 |
| 5,426,637 | 6/1995 | Derby et al. ............................ | 370/85.13 |
| 5,446,736 | 8/1995 | Gleeson et al. ......................... | 370/473 |
| 5,477,415 | 12/1995 | Mitcham et al. ........................ | 361/686 |
| 5,530,963 | 6/1996 | Moore et al. ........................... | 395/200.15 |
| 5,535,338 | 7/1996 | Krause et al. ........................... | 709/222 |
| 5,553,076 | 9/1996 | Behtash et al. .......................... | 370/95.3 |
| 5,572,528 | 11/1996 | Shuen ...................................... | 370/402 |
| 5,675,740 | 10/1997 | Heimsoth et al. ..................... | 395/200.12 |
| 5,717,737 | 2/1998 | Doviak et al. ............................ | 379/58 |
| 5,734,824 | 3/1998 | Choi ......................................... | 709/224 |
| 5,754,552 | 5/1998 | Allmond et al. ........................ | 370/465 |
| 5,857,075 | 7/1996 | Chung ..................................... | 709/223 |

OTHER PUBLICATIONS

Optical Wireless Network for Office Communication. Takahashi, Osa Mu; Touge, Takashi. Telecommunications vol. 20, 1985/1986 p 217–228.

Windows Magazine Jan. 94 by Jeni Boyce Title: Soho: Why Network? Why Not! p. 221–234.

Infrared Data Transmission: The Missing Link? by Lee Goldberg. Electronic Design Apr. 17, 1995 p. 47 to 52, 54–64.

*Primary Examiner*—Ayaz R. Sheikh
*Assistant Examiner*—Frantz Blanchard Jean
*Attorney, Agent, or Firm*—Ormiston Korfanta & Holland, PLLC

[57] ABSTRACT

A system ling client computers, particularly client notebook computers, to communicate with a computer local area network (LAN) using infrared or other transparent links. The system includes a pseudo nic driver, transparent communication hardware, and a transparent link in a network interface unit. The pseudo nic driver hides the technical details of the transparent communications by presenting itself as a traditional nic driver to the client networking software. The network interface unit bi-directionally communicates via the transparent link with an, for example, an infrared enabled client computer and performs the necessary bridging between the low level infrared signals and traditional LAN system such as Ethernet.

1 Claim, 11 Drawing Sheets

APPARATUS TO CONNECT A CLIENT COMPUTER TO A COMPUTER DATA NETWORK

FIELD OF THE INVENTION

This invention relates generally to computer based data networks, in particular to an apparatus that allows a computer to be easily connected to and disconnected from a computer network.

REFERENCES

[1] U.S. Pat. No. 5,736,736
[2] U.S. Pat. No. 5,572,528
[3] U.S. Pat. No. 5,477,415
[4] LAELMP: Dan Axtman, Aaron Ogus, John Reilly, "Lan Access Extensions for Link Management Protocol: IRLAN", (Extended Systems Inc., Hewlett-Packard Corporation, Microsoft Corporation, Proposal to the Infrared Data Association, Jan. 1, 1996.)

BACKGROUND OF THE INVENTION

Modern computing environments often consist of a number of computers interconnected by a computer data network and are well known in the art. Computers thus connected are sometimes called a node, and are sometimes called a client computer. Both terms are used both in the prior art and both terms are used here to refer to a computer intended to be connected to a computer network. U.S. Pat. No. 5,446,736 [1] (the '736 patent) and U.S. Pat. No. 5,572,528 [2] (the '528 patent) adequately describe the background for this art. The '736 patent describes an apparatus to connect a node to a wireless network. The '528 patent describes both a mobile node and specialized routers that manage changing address for roaming mobile nodes.

Computer docking stations offer a different approach to connecting computers to and from additional devices and are well known in the art. U.S. Pat. No. 5,477,415[3] teaches of a sophisticated motorized mechanism that allows a portable computer to be hooked up to a larger keyboard and screen. Although docking stations are generally used to provide access to larger keyboards and screens, the docked station can also provide an access point to the network.

SUMMARY OF THE PRESENT INVENTION

The present invention teaches a new apparatus that allows a computer, including a portable laptop computer, to be easily connected to and disconnected from a computer network. Unlike the prior art, the operation of the present invention requires neither mechanical connections of a docking station nor changes to the targeted network. In the preferred embodiment of the present invention, this result is achieved by the use of infrared enhanced client computers and an infrared network interface unit. Prior art clients can be enhanced to support infrared by the addition of a specialized driver seamlessly installed in a client computer and the addition of inexpensive hardware. The present invention distinguished itself from prior art methods of using infrared and other wireless technologies to connect computers to the network with an improved combination of components that provide inexpensive and seamless connectivity to existing computer networks.

BRIEF DESCRIPTION OF THE DRAWINGS

The advantages of the present invention may be better understood by referring to the drawings and the description that follows.

DESCRIPTION OF ILLUSTRATED EMBODIMENTS

The following first describes a detailed description of the invention in general, and then describes a detailed description of the preferred embodiment of the invention. The illustrations are provide by way of illustration, not of limitation. The invention is limited only by the claims that follow the description.

Figure 1:
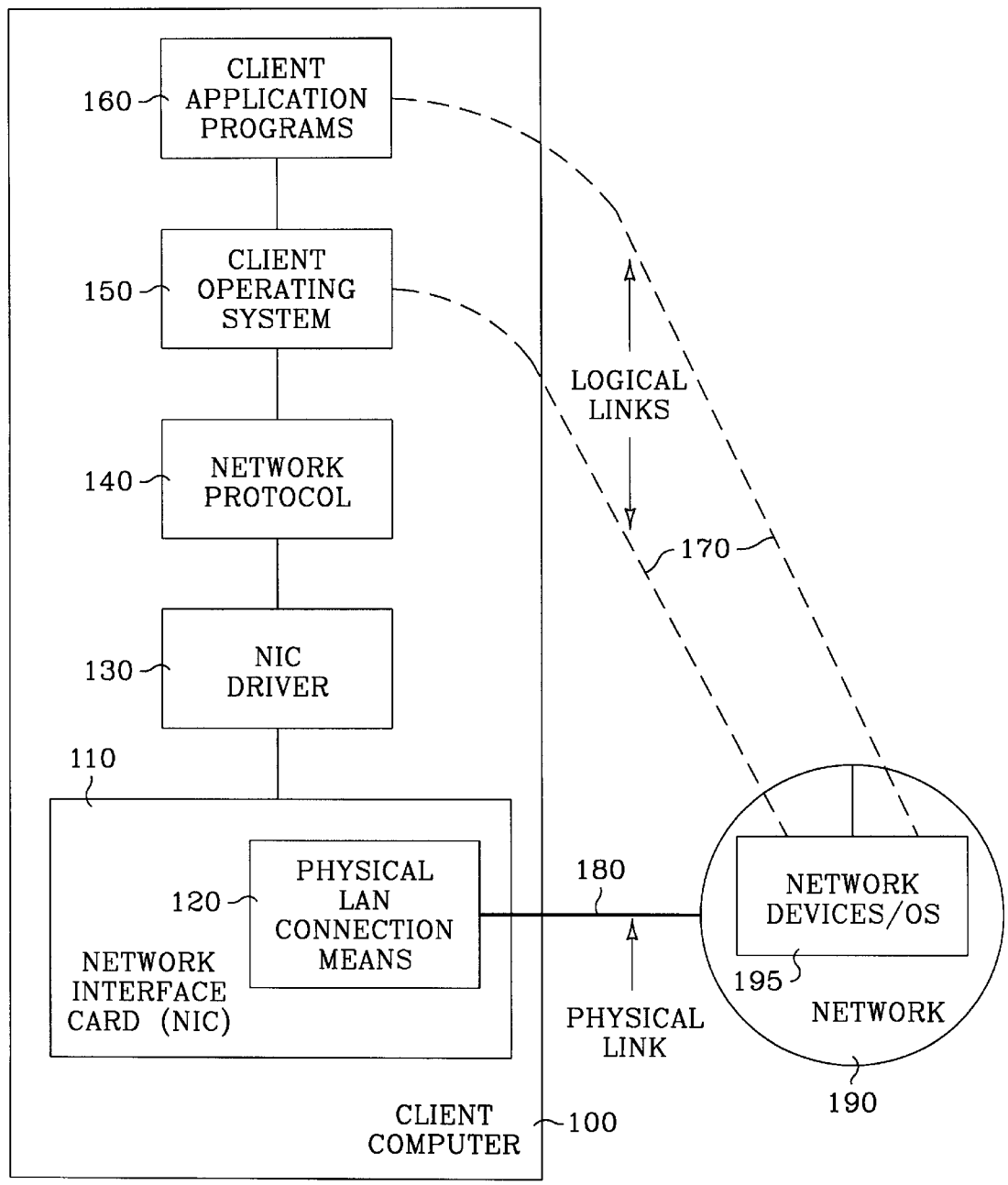
FIG. 1 illustrates a general method for interfacing a client computer to a network according to the prior art.

FIG. 1 show a client computer connected to a network as taught in the prior art. A client computer 100 typically has one or more client application programs 160 executing on the client computer. Although the client application programs 160 execute on the client computer 100, the application programs 160 and the client operating system 150 will often use network resources, including network devices and operating systems and other network objects 95 located on a network 190. Although the client computer 100 is physically apart from the network devices 195, the program logic of client application programs 160 and client operating system 150 reference the network objects 195 as if they were local objects; this logical connection is represented in FIG. 1 by the logical links 170. When a client application program 160 or a client operating system 150 invoke an operation that utilizes network objects 195, the operating system 150 will typically present the request to the underlying network protocol 140 that is bound to the client operating system 150; the network protocol 140 is then presented to the network interface card (nic) driver 130. The role of the network driver 130 is to translated the software-based protocols of the network protocol 140 into specific hardware commands recognized by the hardware network interface card 110. The network interface card (nic) 1 10 then transmits the data over the physical link 180, typically a network wire, through the physical network connector 120 on the nic card 110. The data is presented to the network 190. The network routes the data to the appropriate device or other network object 195 that is the target of the command. Network traffic is generally bidirectional, and the network objects 195 generally responds by transmitting data to the client program 160 or client operating system 150 back through the same path.

Figure 2:
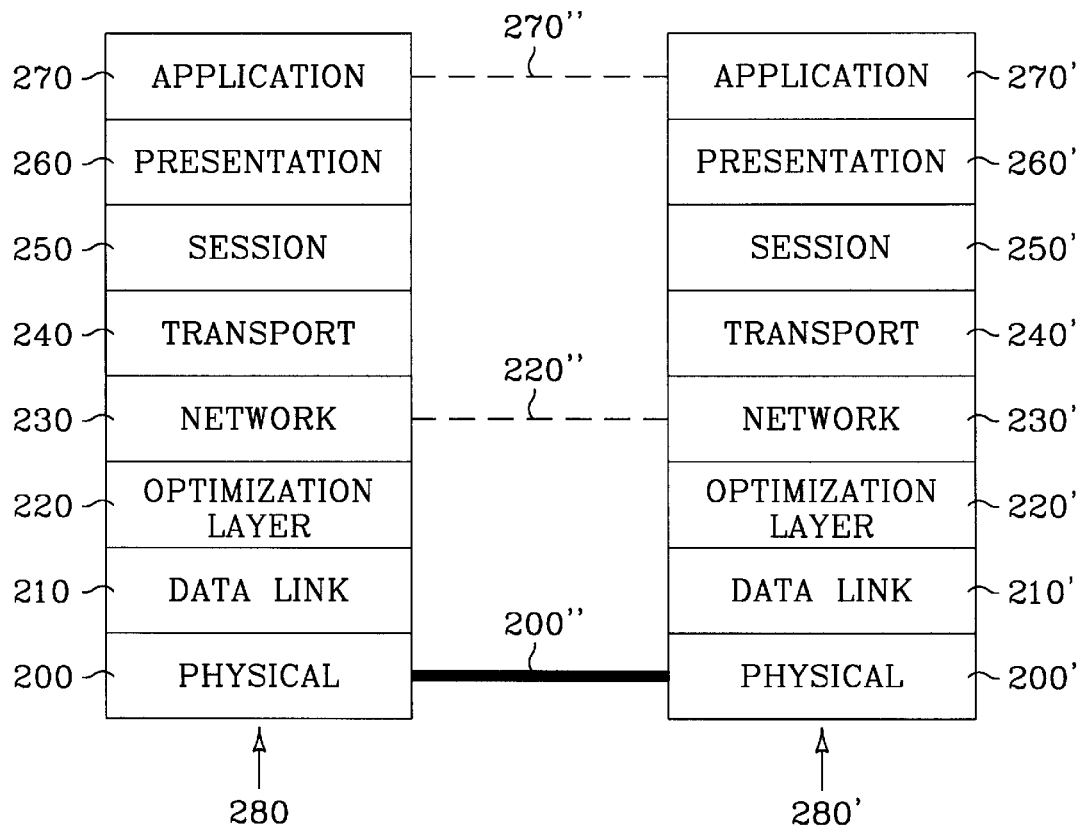
FIG. 2 illustrates a modified version of the ISO model representation of network protocol stacks as modified by the '735 patent in the prior art.

FIG. 2 illustrates a prior art variation of the ISO reference model for networks stacks as described in the '736 patent. FIG. 2 differs from the standard ISO reference model by the inclusion of an optimization layer 220 and 220'. The '736 patent teaches a model where the application program 190 of FIG. 1, represented as the application layer 270 in FIG. 2 communicates through the stack 280 to a physical link 200' which, in the '736 teachings can be a wireless link. In the teachings of the '736 patent, layers 230, 240,250, 260 are unmodified from their customary usage; layer 220 optimizes the customary network protocol 230 and the datalink traffic 210, eventually resulting in a physical wireless transmission to the physical layer 200' of a second protocol stack 280'.

The '736 patent relies on its ability to interface at the network level 230, and thus is sensitive to network level changes in layer 230.

Figure 3:
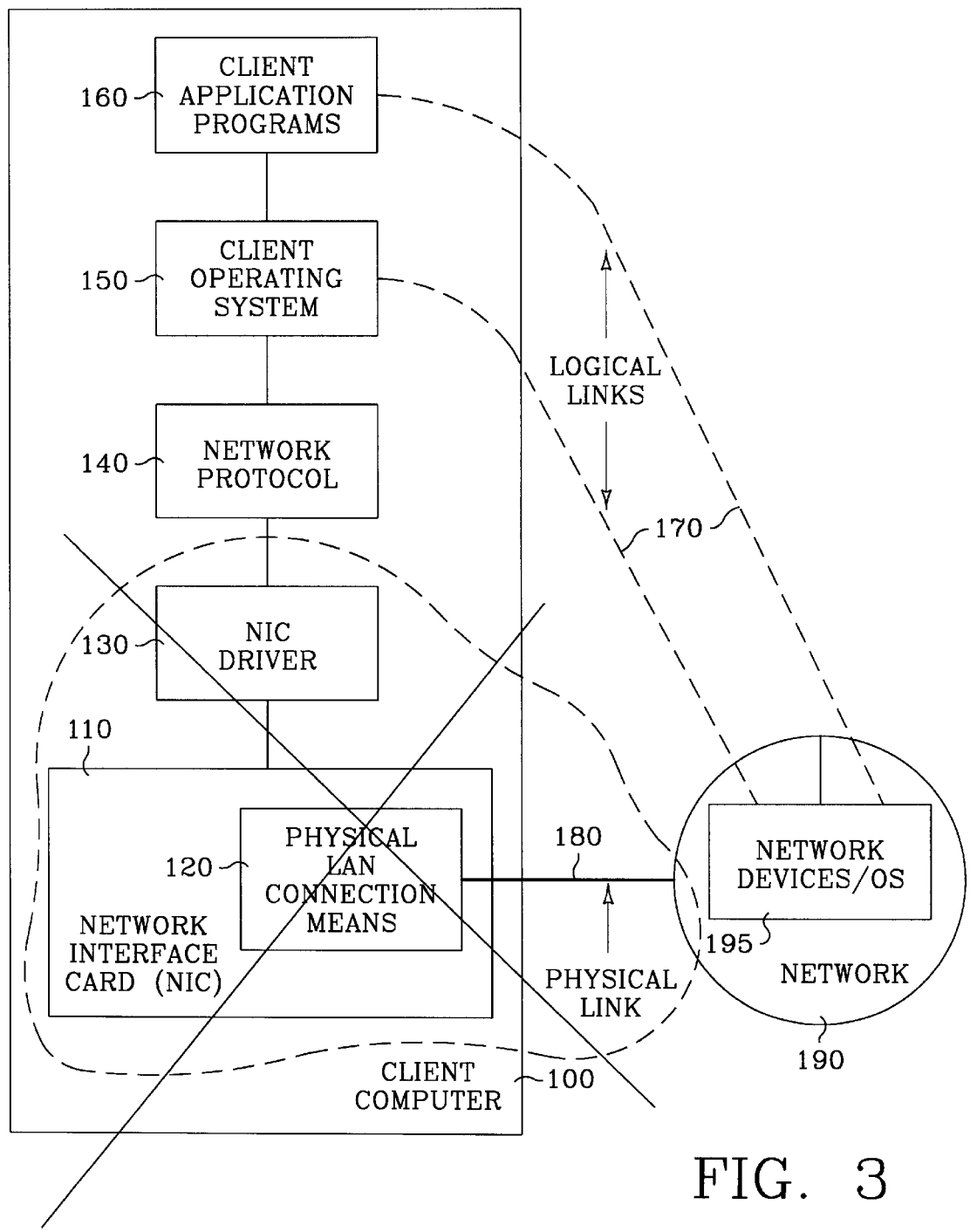
FIG. 3 illustrated the elements of the prior art that are replaced by the present invention.
Figure 4:
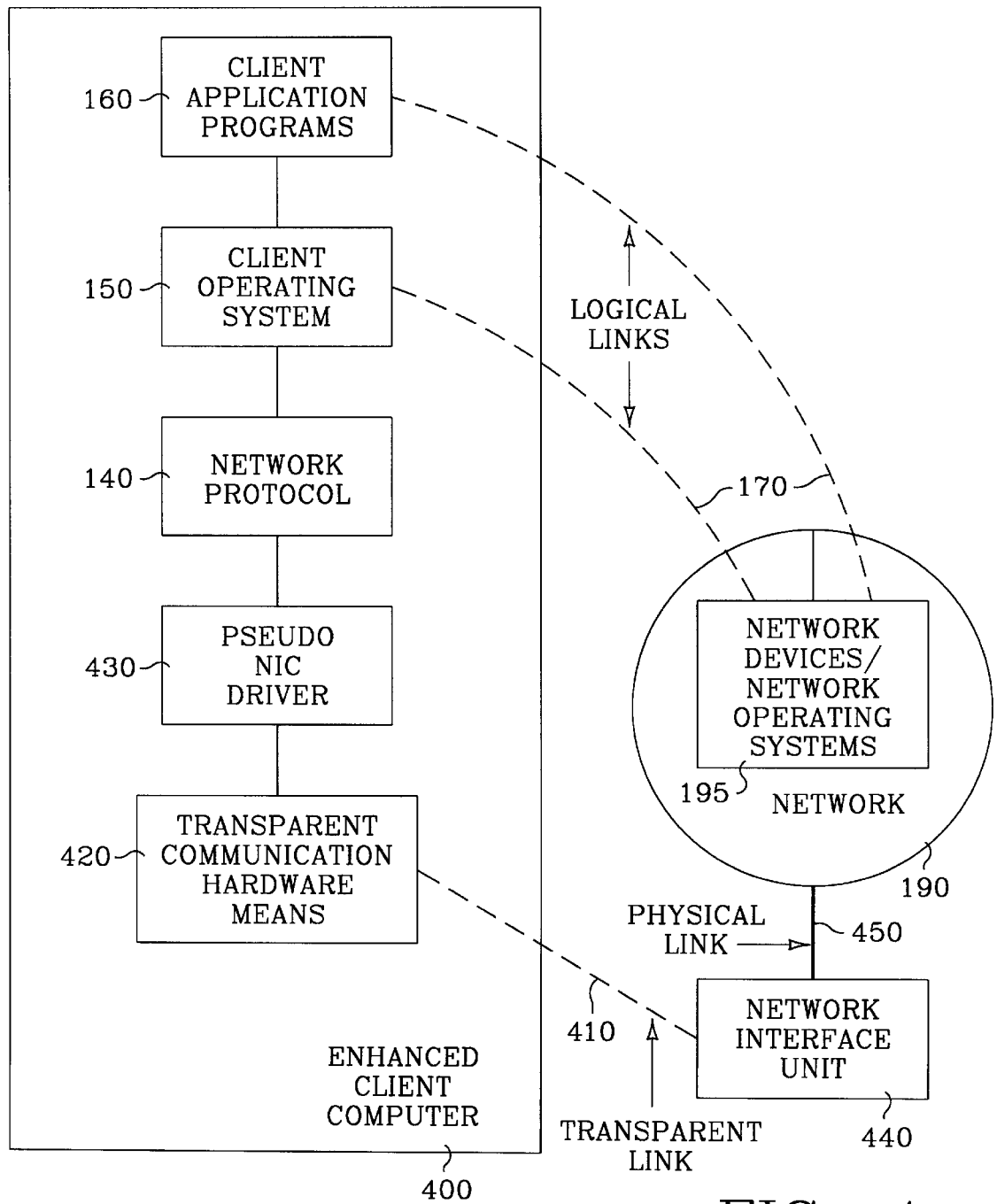
FIG. 4 is a high level block diagram of the present invention generally.

FIGS. 3 and 4 are used to illustrate generally how the present invention differs from the prior art. FIG. 3 identifies components altered or removed from the prior art versions to achieve the present invention. In the present invention, the network interface card 110 and the corresponding physical network connection 120, and the physical link 180 are removed from the client computer 100. In the place of the removed elements are a pseudo nic driver 430, a transparent link 410 and the corresponding transparent communications means 420. The transparent communication means 410 communicates with a new network interface unit 440. The network interface unit 440 communicates with the prior art network of FIG. 1 through a new physical link 450. Although the physical link 450 of the network interface unit 440 is new, it is physically like the original physical link 180, and the network 190 does not need to be changed to recognize this new arrangement because the data present through physical link 450 follows the established network protocol 140, known by both the client application programs 160, the client operating system 150, the network 190 generally. Since the logical links 170 have been preserved without a need for modification, as well as the applications program 160, the client operating system 150, the network protocol 140, and the network 190, the enhanced client computer 400 operates like the client computer 100, yet is connected to the network in a novel way.

A significant advantage of the present invention over the prior art as shown in FIG. 1 is the inclusion of the transparent link 410. Transparent link and the corresponding term transparent communication s are terms of art used here to designate the broad category of communication links and communication means based generally on easy to connect and disconnect technologies. Transparent links include, but are not limited to traditional wireless technologies such as infrared transmissions and radio communications. The present invention is applicable using any transparent link technology, known or new, dissimilar from traditional from hard-wire network cabling, that facilitates easy connection access to and easy disconnection from a network.

Figure 5:
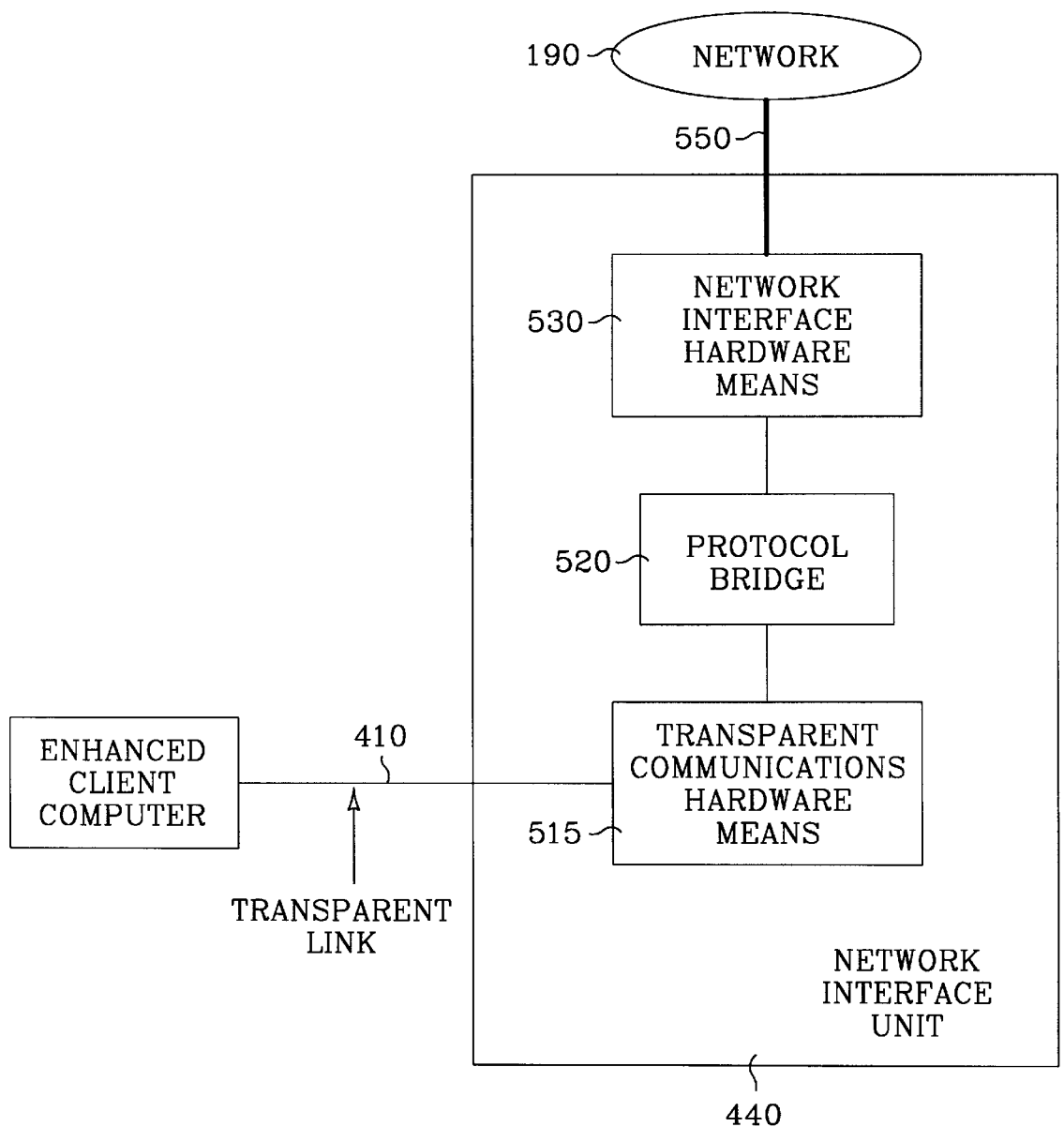
FIG. 5 is an expanded block diagram of the network interface unit generally of the present invention.

The new network interface unit 440 is shown in greater detail in FIG. 5. The network interface unit 440 interfaces with the enhanced client computer 400 over the transparent link 410 using a transparent communication hardware means 515. The hardware means 515 can be the same means as the client transparent communications hardware means 420, but it can be different as long as it correctly interfaces with the transparent link 410. The hardware means 515 generally converts the data from the physical transparent link 410 and presents it bi-directionally to the protocol bridge 520. The implementation of the protocol bridge 520 depends both on the choice of the transparent communications hardware means 515 and the choice of the specific network hardware means 530. The network interface hardware means is a means to present the protocol to a network physical wire 190, and is generally a network interface chip (nic), well known in the art. Such chips are used in mass-market NIC cards.

Figure 6:
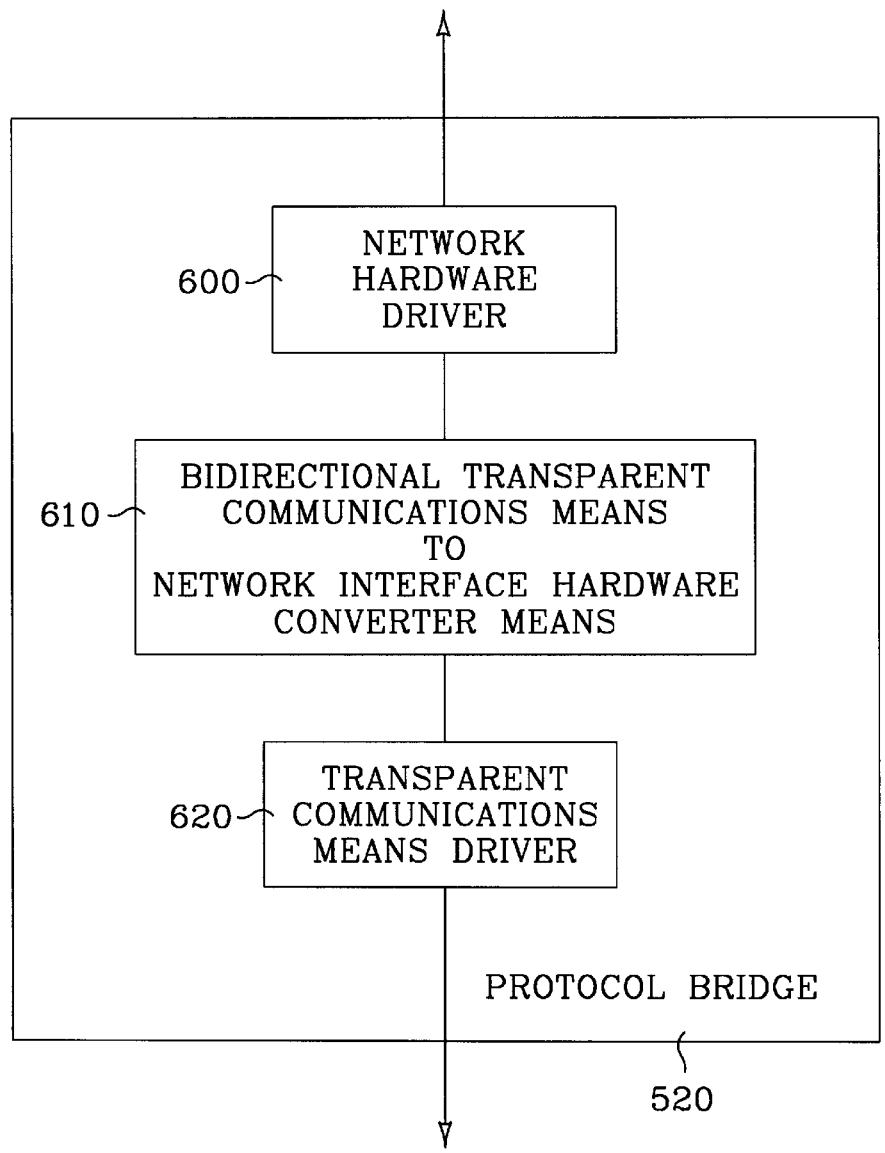
FIG. 6 is an expanded block diagram of the protocol bridge generally of the present invention.

FIG. 6 shows generally the protocol bridge 520 in more detail. In general, the protocol bridge consists of three components: a bi-directional converter 610, and two drivers—a network hardware driver 600 and a transparent communications means driver 620. Each driver is a software component that talks to and manages its respective hardware. The converter has the responsibility to both convert the data in a hardware sense, but to also compensate for differences between the transparent communication means and the network means. Typically, transparent means are slower than networks. The converter 610 often will be required to intelligently detect both overruns, and junk mail network traffic and in some cases discard network data packets presented by either means. The rules of which packets can be discarded are network protocol specific, but generally all network protocols allow packets to be lost in some situations, requiring a retransmission in most cases. If the converter is intelligent, it in some cases improves network performance. The particulars of how to generally implement such an optimizing converter are known in the prior art and are taught generally in the '736 patent.

Although the present invention and the '736 patent both provide a means to easily connect and disconnect a client computer from a network, different methodologies are used to achieve distinctly different behaviors. The differences can be illustrated by way of the ISO reference model of FIG. 2.

Figure 7:
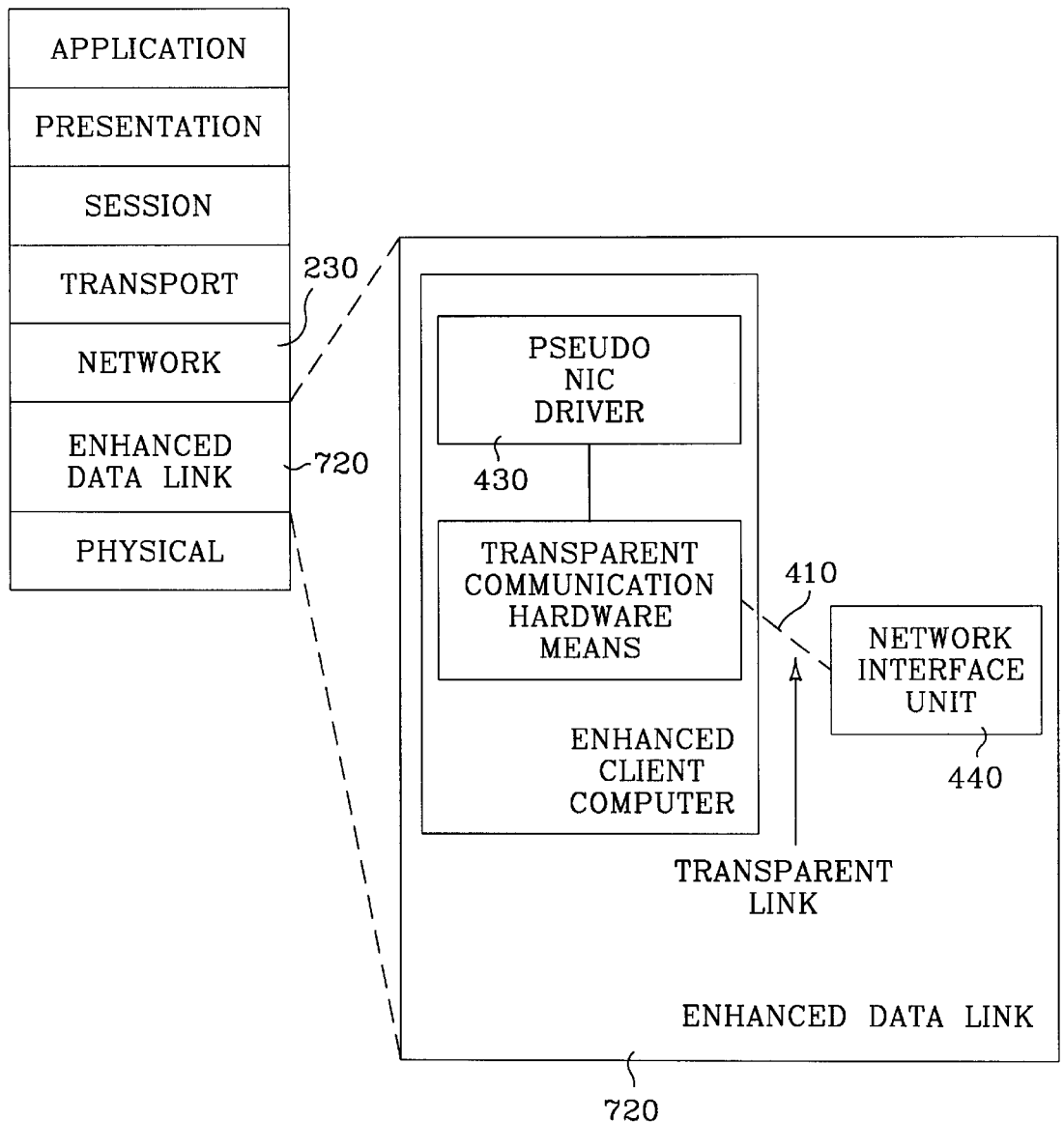
FIG. 7 is an illustration of one way to view the present invention in terms of the ISO reference model for protocol stacks.

The '736 patent has a model in which the client computer and the reception means for the wireless communication are represented as symmetric protocol stacks 280 and 280' in FIG. 2. FIG. 7 illustrates how the present fits in the ISO reference model. In FIG. 7, the entire network interface unit 440, as well as the pseudo nic driver 430, the transparent communications hardware means 420, and the transparent link 410 itself are all hidden within the data link, lower level than that taught by the '736 patent.

This novel arrangement has distinct advantages over the prior art teachings of the '736 patent and related technologies. As a general rule, as you go down the ISO reference stack, each layer becomes more generalized. In the present invention, the lower positioning of the present invention better shields the invention from network variations than the prior art position just below the network layer 230 in FIG. 2, providing the benefit of better network independence. In addition, because the details of the transparent communications are contained and isolated within a single ISO stack, the entire system under the present invention is contained a single node on the network and is fully hidden from the network. Thus the introduction of the transparent link 410, functionally different from physical link 450, is completely hidden from the network. This obviates the need for changes to routers as taught by the '528 patent to address mobile nodes. The presence of the transparent link is better hidden from the underlying network, allow the technology to be easily integrated into existing networks.

Figure 8:
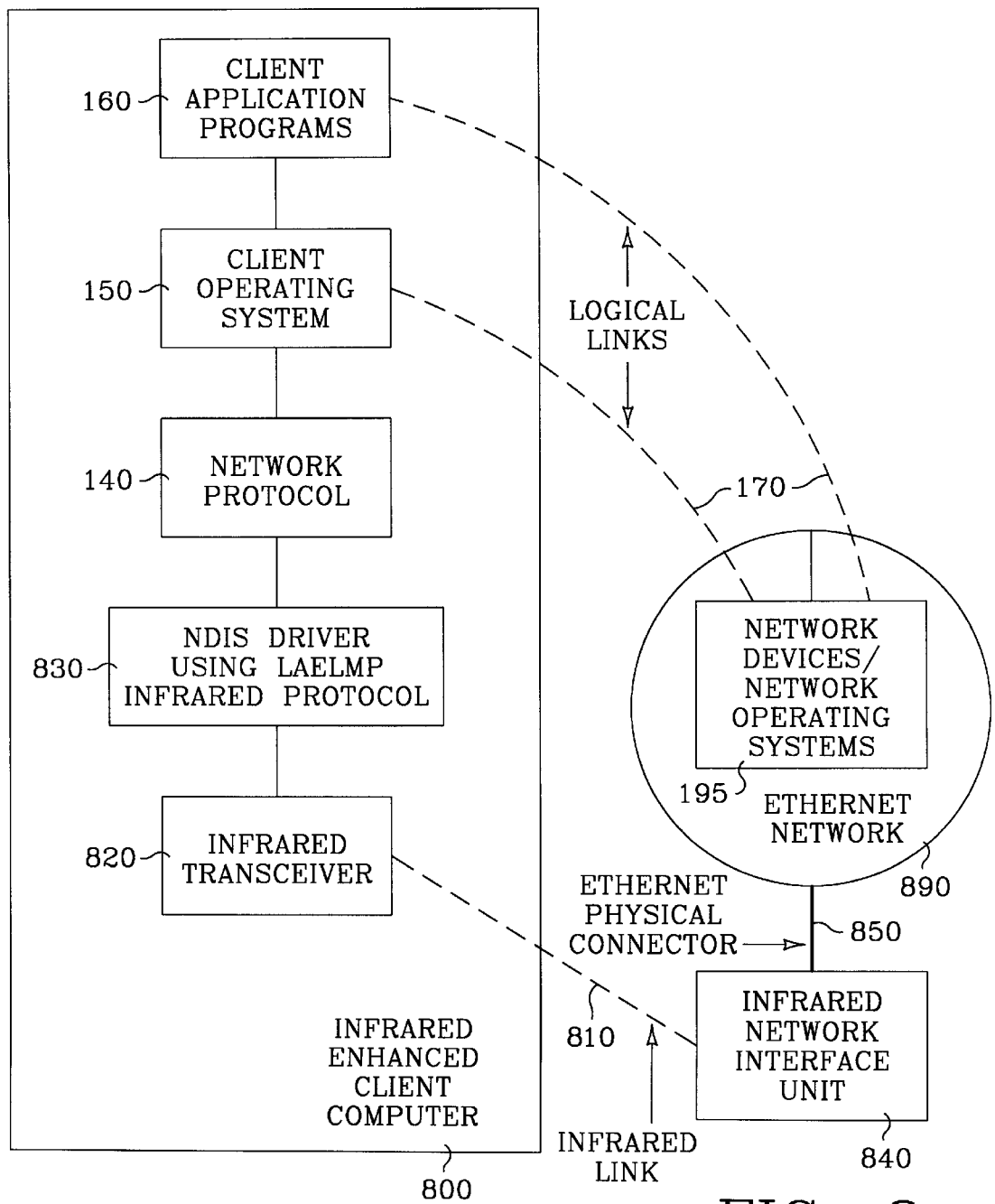
FIG. 8 is a high level block diagram of the preferred embodiment of the present invention.
Figure 9:
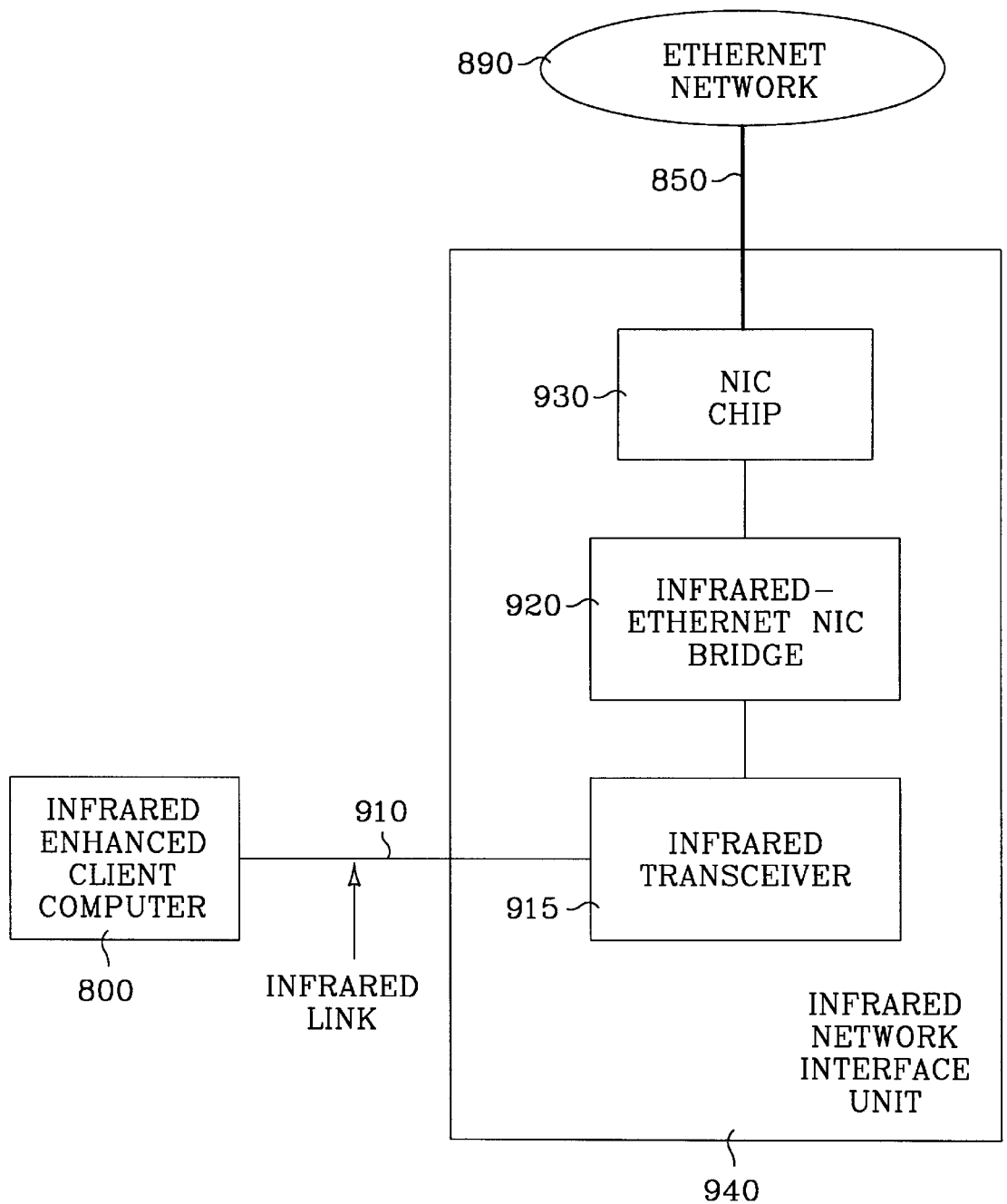
FIG. 9 is an expanded block diagram of the network interface unit of the preferred embodiment of the present invention.
Figure 10:
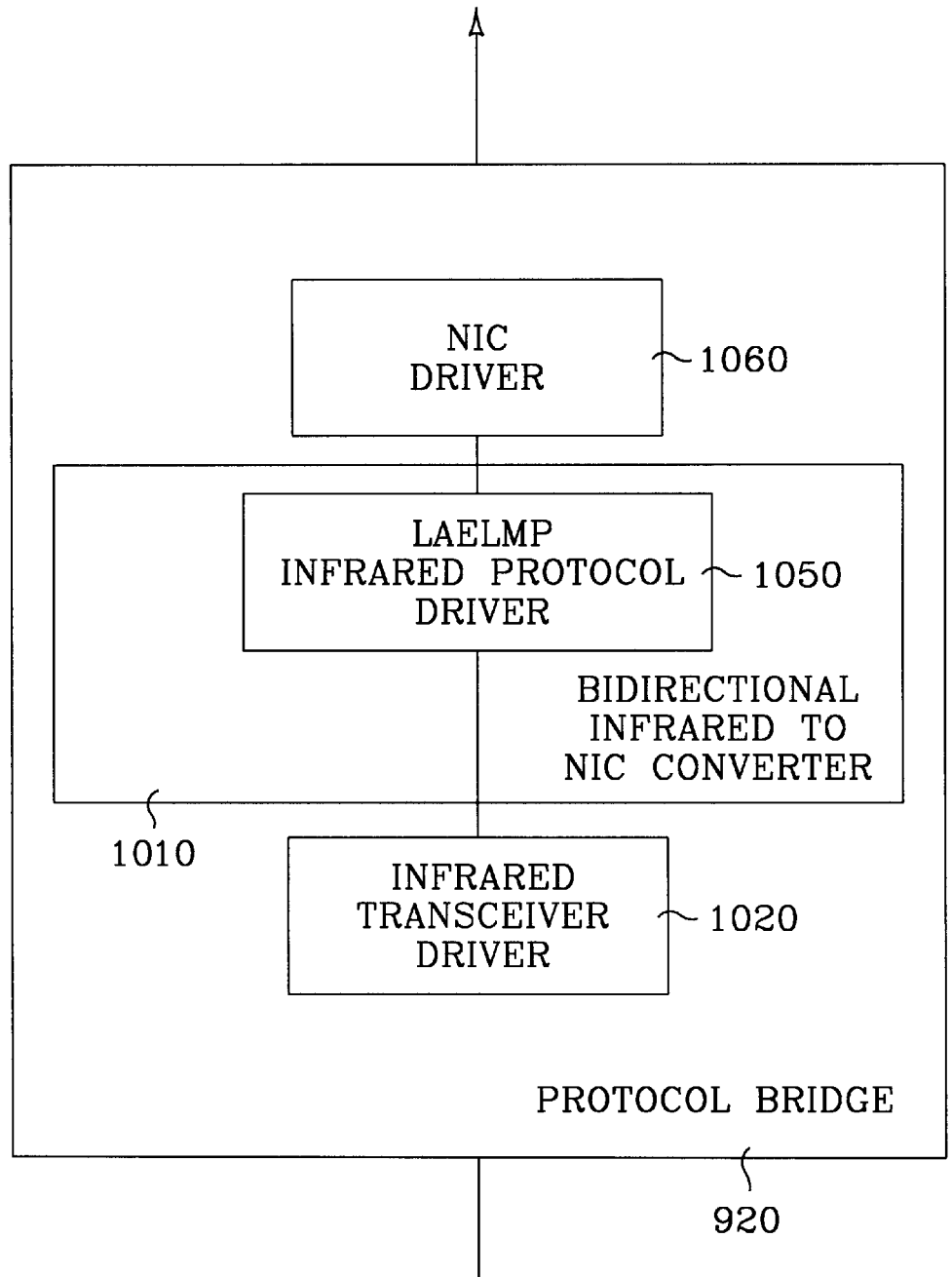
FIG. 10 is an expanded block diagram of the protocol bridge of the preferred embodiment of the present invention.

The preferred embodiment of the present invention is illustrated in FIGS. 8 through 10, and is presented for purposes of illustration rather than limitation. In the preferred embodiment, the transparent link 410 of FIG. 4 is realized by the infrared link 810 of FIG. 8. The target network of the preferred embodiment is an Ethernet network, typically hosting TCP/IP and SP/IPX protocols as well as other popular protocols. The enhanced client computer 400 is an infrared enhanced client computer 800 in the preferred embodiment. These clients are typically either manufactured with infrared capabilities built in, or, alternatively, infrared capabilities can be added with add-on hardware. The client environment for the preferred embodiment is Microsoft Windows, currently either Windows 95 or Windows NT. The preferred embodiment of the pseudo nic driver 430 of FIG. 4 is a Microsoft NDIS driver 830 using a specific infrared point-to-point protocol described herein [4], called LAELMP for convenience. The NDIS specification is well known in the art and is not detailed here. The NDIS and Microsoft model generally follow the ISO reference model, but not exactly. NDIS is lower on the ISO reference model and is protocol independent, unlike the data link level 210 of the traditional ISO model or the optimization level taught in the '736 patent. The present invention, by operating at a lower level in the ISO model than the 'teaching of the 736 patent, achieves protocol independence. The LAELMP infrared protocol, disclosed herein, is a detailed specification showing how a client side driver, such as the NDIS driver 830 of FIG. 8 can communicate with a targeted device using an infrared channel; in this case the target device is the infrared network interface unit 840. Since infrared only operates in a single direction at a time, the LAELMP protocol specifies, among other things, how data connections are formed and how the channel is synchronized to avoid data loss through simultaneous transmission by both sides. The LAELMP protocol has been offered to a public standards body and is expected to become a public standard for infrared connectivity products.

FIG. 9 show the preferred embodiment of the network interface unit 440 of FIG. 4, namely the infrared network interface unit 940 of FIG. 9. In the preferred embodiment, the transparent link 410 is an infrared link 910. The transparent communications hardware means 515 in the preferred embodiment is an infrared transceiver 915 of FIG. 9, and is implemented with a infrared chip, the IBM 31T1502 infrared communications controller. The same part is used for the infrared transceiver 820 in FIG. 8. The protocol bridge 520 in the preferred embodiment is the infrared ethernet nic bridge 920 of FIG. 9. The bridge 920 in the preferred embodiment bi-directionally interfaces the infrared transceiver 915 with the nic chip 930. The nic chip 930 is a commodity part well known in the art. The preferred embodiments uses a National Semiconductor SNIC for the nic chip 930, part number DP83902AVLJ. The Ethernet physical connectors 850 in the preferred embodiment include both a 10BaseT RJ-45 connector and a 10BaseT2 BNC connector, allowing physical connection to the network by either RJ-45 twisted pair or widely used coax.

In FIG. 10, the infrared-Ethernet nic protocol bridge 920 is more fully illustrated. The NIC driver 1060 of FIG. 10 is a customized driver. The methodology for writing such a driver is well known in the art once both interfaces are known. The nic chip 930 is well specified by vendor documentation in the prior art; the LAELMP infrared protocol is specified herein, thus the method of building this driver are apparent to one skilled in the art of driver writing. Likewise, the infrared transceiver driver 1020 of FIG. 9 of the preferred embodiment can be built by one skilled in the art using well known method once both interface specifications are known and both are disclosed either here or in the prior art. Likewise, the specifications for an infrared transceiver 915 is well specified by the corresponding vendor documentation not included here. The LAELMP infrared protocol driver 1050 is included herein, thus teaching one skilled in the art how to make such a driver.

The LAELMP protocol driver 1050 uses the same LAELMP protocol used in the NDIS driver 830 of FIG. 8 in the infrared enhanced client computer 800. The disclosure herein of LAELMP protocol is made to ensure one skilled in the art can write such a driver.

The LAELMP driver 1050 of the preferred embodiment also intelligently monitors network traffic. In the preferred embodiment, infrared traffic travels at a maximum rate of 15,000 bits per second. The Ethernet network, can handle data at a rate of over 10,000,000 bits per second, nearly 100 times as fast. However, the Ethernet network is serving multiple nodes, but the infrared channel is serving a single node. To minimize overload, the converter 1010 detects that infrared overload is imminent and discards packets in the following order: First packets known as broadcast packets are discarded. Next, address verification packets such as IPX RIPS and SAPS and IP arps are discarded. Finally, as a last resort, unicast packets designated for this node are discarded.

Figure 11:
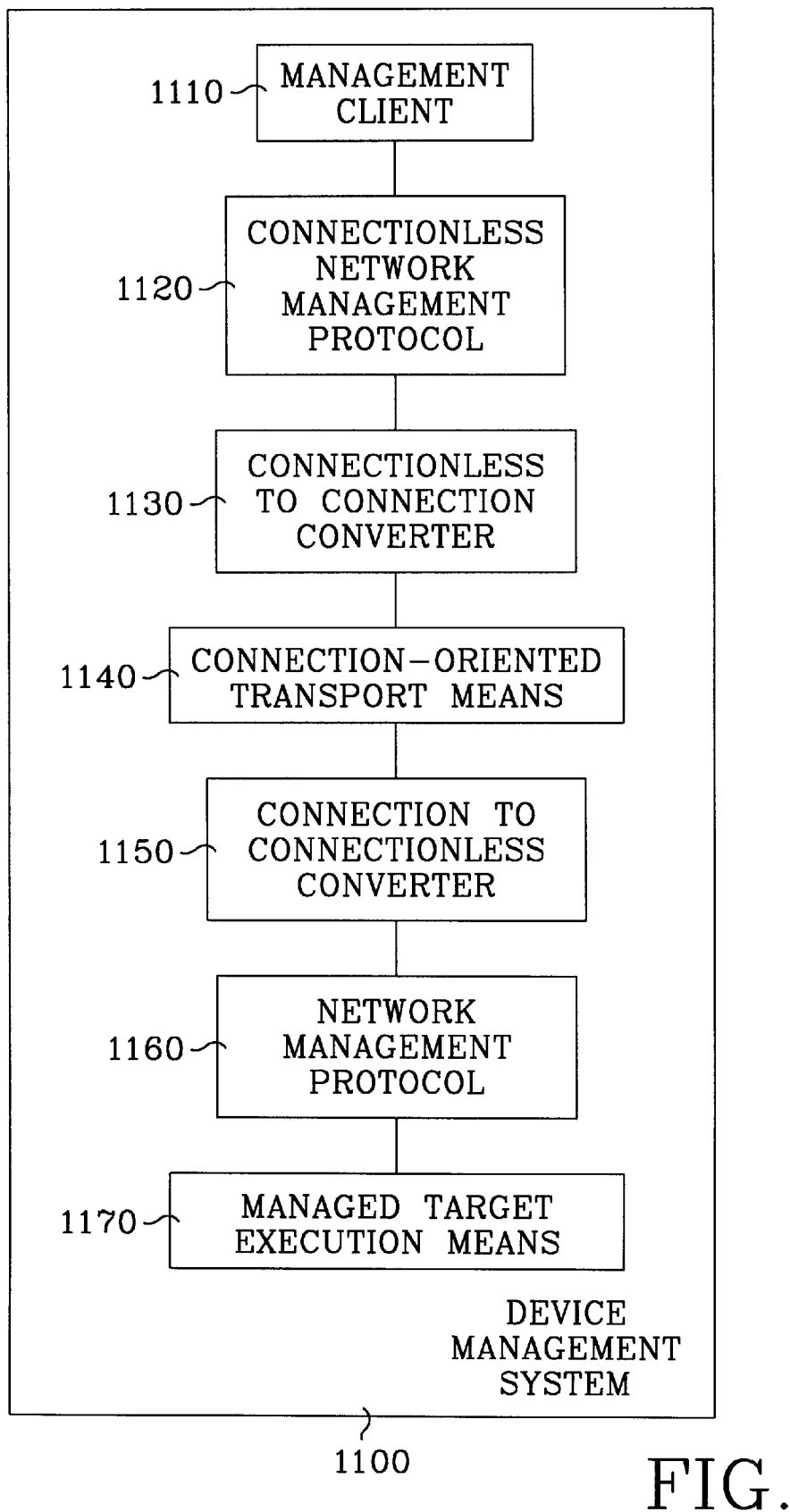
FIG. 11 is a block diagram of the device management system of the present invention.

The preferred embodiment of the infrared network interface unit 940 in FIG. 9 also includes a device management system 1100 as shown in FIG. 11 to allow management of the network interface unit 940. The device management system is generally described in the FIG. 11, and is omitted from FIG. 9. Since the novel design of the present invention hides the network interface unit 940 from the Ethernet network 190 generally, an additional management control path is needed. Network management protocols customarily are used to manage devices on a network 190, but since the network interface unit 440 of the present network is not recognized by the network as a separate unit, traditional SMNP over the network cannot be used. The present invention instead uses the infrared connectivity from infrared link 910 of FIG. 9 to provide management interface. SNMP is desirable for use because it is well known making it easy to adapt client management interface to support it. Unfortunately, the infrared protocol is a connection-oriented protocol where as traditional SMNP requires a connectionless protocol. The device management system 1100 in FIG. 11, solves the problem in a novel way. The device management system 1100 has a management client, typically Windows 95, and uses a connectionless management protocol such as SNMP. The present invention introduces a connectionless to connection converter 1130 and a corresponding optional connection to connectionless converter 1150 as shown in FIG. 11. This novel arrangement allows popular management protocols to be used in environments that do not support such protocols in the prior art. In the preferred embodiment, an infrared enhanced Windows 95 client 110 can connect to a network interface unit 940 by infrared beam using SNMP management software based on the SNMP management protocol 120. The converter 1130 is an SNMP to LAELMP converter encodes SNMP within LAELMP and which transparently makes a connection when necessary to the corresponding LAELMP driver 1050 in the network interface unit 940. It uses the LAELMP protocol to transmit the LAELMP encoded SNMP data to the unit 940. The corresponding converter 1250 is in inside the network interface unit 940. It can either translate the data back to SNMP using the converter 1150 of FIG. 11, or it can simply parse the command directly and execute the management command using well known and customary management execution means 1170. SNMP return data is transmitted back to the client in an analogous fashion.

The foregoing description has necessarily been limited to specific embodiments of this invention. The present invention may be embodied in other forms without departing from its spirit or essential characteristics. The scope of this invention is indicated by the appended claims and their equivalents rather than the foregoing description.

Other variations, included for illustrative purposes, not as limitations, include faster speed infrared technology include 1.2 megabit, 4 megabit, and multiple mode variations.

Additional network media types such as token ring are contemplated. In addition to an NDIS based pseudo nic driver, other protocols including PPP and ODI are contemplated.

We claim:

1. A network interface unit for interfacing an enhanced client computer with a local area network, comprising:

an infrared transceiver;

a nic chin;

an infrared Ian bridge in operative communication between the infrared transceiver and the nic chip; and an ethernet connector connecting the nic chip to the network.

\* \* \* \* \*